(No Model.)
H. D. SMART.
NUT LOCK.
No. 600,748. Patented Mar. 15, 1898.
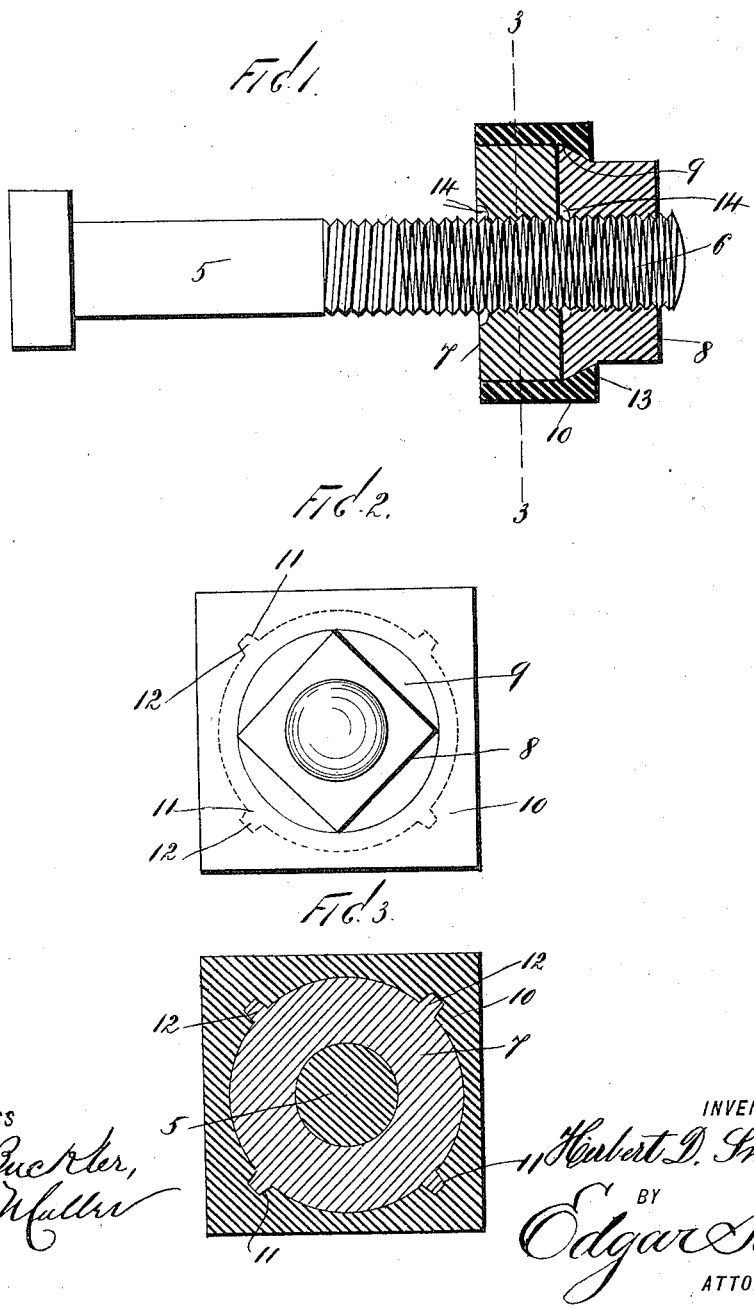
WITNESS
John Buckler,
L. W. Muller
INVENTOR
Hubert D. Smart
BY
Edgar Tate & Co.
ATTORNEYS

UNITED STATES PATENT OFFICE.

HERBERT DURRELL SMART, OF NASHUA, NEW HAMPSHIRE, ASSIGNOR OF ONE-HALF TO HARRY D. BOWEN, OF WORCESTER, MASSACHUSETTS.

NUT-LOCK.

SPECIFICATION forming part of Letters Patent No. 600,748, dated March 15, 1898.

Application filed November 4, 1897. Serial No. 657,415. (No model.)

*To all whom it may concern:*

Be it known that I, HERBERT DURRELL SMART, a citizen of the United States, residing at Nashua, in the county of Hillsborough and State of New Hampshire, have invented certain new and useful Improvements in Nut-Locks, of which the following is a full and complete specification, such as will enable those skilled in the art to which it appertains to make and use the same.

This invention relates to nut-locks; and the object thereof is to provide an improved device of this class which is adapted to be used on bolts, spindles, and shafts and, in fact, wherever nut-locks are required.

The invention is fully disclosed in the following specification, of which the accompanying drawings form a part, in which—

Figure 1 is a side view of a screw-threaded bolt, showing my improved nut-lock in section; Fig. 2, an end view thereof, and Fig. 3 a section on the line 3 3 of Fig. 1.

In the drawings forming part of this specification the separate parts of my improvement are designated by the same numerals of reference in each of the views, and in said drawings I have shown at 5 a bolt which is provided at one end with a double screw-thread, as shown at 6, the threads on said bolt being respectively right and left hand threads; and in the practice of my invention I provide a nut-lock which consists of two separate nuts 7 and 8, constructed and united in the following manner:

The nut 7 is larger in cross-section than the nut 8, and the nut 8 is provided at the end thereof adjacent to the nut 7 with an annular flange or rim 9, which is preferably triangular in cross-section. The body portion of the nut 8 is also angular in form, and the nut 7 is circular in form and provided with a collar 10, which is angular in form on its outer side, and said collar is provided with a central circular bore in which are formed longitudinal grooves 11, and the nut 7 is provided with ribs 12, which fit in said grooves, and said collar 10 is provided at its outer end with an inwardly-directed annular flange 13, which overlaps the flange 9 on the nut 8.

In practice the nut 8 is placed adjacent to the nut 7, as shown in Fig. 1, and the collar 10 is then secured to the nut 7 in any desired manner, preferably by shrinking it thereon, and the object of the ribs 12 on the nut 7 and the grooves 11 in the collar 10 is to prevent said collar from turning on the nut 7.

In connecting the nuts 7 and 8, as described, care should be taken that the nut 8 does not press firmly on the nut 7, the object of this construction being to provide means whereby the nut 8 may be freely turned independently of the nut 7 when said nuts are connected by the collar 10, as described. The nuts 7 and 8 are also provided on their inner surfaces with circular cavities or recesses 14, which are intended to facilitate the operation of screwing said nuts onto the bolt 5, and in securing the nuts 7 and 8 onto the bolt 5 one of them is turned in one direction and the other in the opposite direction.

The threads in the nuts 7 and 8 are opposite threads, or, in other words, one of them is provided with a right-hand and the other with a left-hand thread, and when said nuts have been screwed onto the bolt 5, as described, they cannot be removed except by reversing the operation by which they were screwed onto said bolt. When thus screwed into position, it will be seen that the nut 8 cannot work off, because it is held in position by the flange or rim 13 on the collar 10, and the nut 7 cannot work off for the reason that it is held in place by the nut 8, and said nuts cannot be removed from the bolt without turning them in opposite directions, and it will be apparent that the loss of said nuts from the bolt or the accidental removal thereof will be practically impossible.

In order to avoid cutting reverse threads on the same part of the bolt, I may make the end thereof on which the outer nut is placed smaller than that part on which the inner nut is placed and connect the nuts as herein described.

My improved nut-lock is simple in construction and operation and is perfectly adapted to accomplish the result for which it is intended, and it will be apparent that changes in and modifications of the construction herein described may be made without departing from the spirit of my invention or sacrificing its advantages.

Having fully described my invention, I claim as new and desire to secure by Letters Patent—

1. The combination with a bolt provided at one end with right and left threads, of an inner and an outer nut adapted thereto, a collar surrounding said inner nut and of greater depth and provided upon its outer face with an inwardly-extending annular flange, the said outer nut provided upon its inner face with an outwardly-extending annular flange adapted to engage the inner face of the flange of said collar and means for locking the collar and the inner nut together, substantially as described.

2. The combination with a bolt provided at one end with right and left threads, of an inner and an outer nut adapted thereto, the inner nut being circular in form and provided with a plurality of ribs, a collar surrounding said inner nut and having a plurality of grooves adapted to engage said ribs and lock the two together, an inwardly-extending annular flange formed upon the outer face of the nut and above the inclosed inner nut providing an annular space therein, the outer nut provided upon its inner face with an outwardly-extending annular flange adapted to engage the under surface of the flange of said collar and fill said annular space, substantially as described.

In testimony that I claim the foregoing as my invention I have signed by name, in presence of the subscribing witnesses, this 30th day of October, 1897.

HERBERT DURRELL SMART.

Witnesses:
FRANCIS M. PHELAN,
FRANK P. PADULA.